US011277785B2

(12) United States Patent
Yang et al.

(10) Patent No.: US 11,277,785 B2
(45) Date of Patent: Mar. 15, 2022

(54) COMMUNICATION METHOD AND APPARATUS

(71) Applicant: HUAWEI TECHNOLOGIES CO., LTD., Guangdong (CN)

(72) Inventors: Chaobin Yang, Shanghai (CN); Yong Wang, Shanghai (CN); Quanzhong Gao, Shanghai (CN); Wei Chen, Shanghai (CN); Liwen Zhang, Shanghai (CN); Xiaojun Zheng, Shanghai (CN); Bin Xiong, Shanghai (CN); Shuai Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 16/715,734

(22) Filed: Dec. 16, 2019

(65) Prior Publication Data

US 2020/0120582 A1    Apr. 16, 2020

Related U.S. Application Data

(63) Continuation of application No. PCT/CN2018/091189, filed on Jun. 14, 2018.

(30) Foreign Application Priority Data

Jun. 16, 2017 (CN) .......................... 201710459008.8

(51) Int. Cl.
*H04W 48/12* (2009.01)
*H04W 72/04* (2009.01)
*H04W 24/10* (2009.01)
*H04W 74/08* (2009.01)
*H04W 56/00* (2009.01)

(52) U.S. Cl.
CPC .......... *H04W 48/12* (2013.01); *H04W 24/10* (2013.01); *H04W 56/001* (2013.01); *H04W 72/0453* (2013.01); *H04W 74/0833* (2013.01)

(58) Field of Classification Search
None
See application file for complete search history.

(56) References Cited

U.S. PATENT DOCUMENTS 9,107,200 B1   8/2015   Naim et al.
9,660,741 B2   5/2017   Yang et al.
(Continued)

FOREIGN PATENT DOCUMENTS

CN    1663300 A      8/2005
CN    101959249 A    1/2011
(Continued)

OTHER PUBLICATIONS

PCT International Search Report and Written Opinion in International Application No. PCT/CN2018/091,189, dated Aug. 20, 2018, 13 pages (With Partial English Translation).
(Continued)

*Primary Examiner* — Saba Tsegaye
(74) *Attorney, Agent, or Firm* — Fish & Richardson P.C.

(57) ABSTRACT

Embodiments of this application relate to the field of wireless communications technologies, and provide an access method, a switch method, and an apparatus. The access method includes: receiving, by a terminal, a system message via a downlink carrier, where the system message includes information used to indicate a frequency channel number of a second uplink carrier; and initiating, by the terminal, random access via the second uplink carrier, where a frequency channel number of the downlink carrier belongs to a first frequency band, and a frequency channel number of the second uplink carrier belongs to a second frequency band.

20 Claims, 7 Drawing Sheets

(56) References Cited

U.S. PATENT DOCUMENTS

| | | | |
|---|---|---|---|
| 2011/0207495 A1 | 8/2011 | Gerstenberger et al. | |
| 2012/0257532 A1 | 10/2012 | Nakada | |
| 2013/0016690 A1* | 1/2013 | Jeong ................. | H04W 24/10 370/329 |
| 2014/0036743 A1 | 2/2014 | Olfat | |
| 2018/0351704 A1* | 12/2018 | Papasakellariou .... | H04L 1/1812 |
| 2018/0376510 A1* | 12/2018 | Sun ................. | H04W 72/0486 |

FOREIGN PATENT DOCUMENTS

| | | |
|---|---|---|
| CN | 103702379 A | 4/2014 |
| CN | 105577338 A | 5/2016 |
| CN | 108633019 A | 10/2018 |
| WO | 03094541 A1 | 11/2003 |
| WO | 2010144875 A2 | 12/2010 |
| WO | 2016053164 A1 | 4/2016 |

OTHER PUBLICATIONS

Extended European Search Report issued in European Application No. 18817566.5 dated May 29, 2020, 8 pages.

Huawei et al., "Overview of NR UL for LTE-NR coexistence," 3GPP TSG RAN WG1 Meeting #89, R1-1709383, Hangzhou, China, May 15-19, 2017, 17 pages.

Office Action issued in Chinese Application No. 201710459008.8 dated Mar. 23, 2021, 16 pages.

* cited by examiner

COMMUNICATION METHOD AND APPARATUS

CROSS-REFERENCE TO RELATED APPLICATIONS

This application is a continuation of International Application No. PCT/CN2018.091189, filed on Jun. 14, 2018, which claims priority to Chinese Patent Application No. 201710459008.8, filed on Jun. 16, 2017. The disclosures of the aforementioned applications are hereby incorporated by reference in their entireties.

TECHNICAL FIELD

This application relates to the field of wireless communications technologies, and in particular, to a communication method and apparatus.

BACKGROUND

With the development of mobile communications technologies, requirements of end users are diversified, wireless networks need to be accessed anywhere and anytime, and uplink and downlink data need to be transmitted. This poses a high requirement for radio resource coverage. However, radio resources are limited, and how to effectively utilize radio resources becomes an urgent problem to be resolved.

SUMMARY

This application describes a communication method and apparatus, to effectively utilize radio resources.

According to a first aspect of this application, an access method is provided, including:

receiving, by a terminal, a system message via a downlink carrier, where the system message includes information used to indicate a frequency channel number of a second uplink carrier, and initiating, by the terminal, random access via the second uplink carrier; where a frequency channel number of the downlink carrier belongs to a first frequency band, the frequency channel number of the second uplink carrier belongs to a second frequency band, and the first frequency band and the second frequency band are different.

When a terminal accesses a base station, an uplink frequency band and a downlink frequency band of the terminal may be different, so that appropriate frequency band resources may be selected, based on an actual network status, for uplink transmission and downlink transmission. A frequency band selected for an uplink carrier may be lower than a frequency band selected for a downlink carrier, to increase uplink coverage, so that the radio resources are effectively utilized. When some frequency band resources are not effectively utilized, the terminal that has another downlink frequency band may use an uplink frequency band that is not effectively utilized, so that the radio resource can be effectively utilized.

In an optional design, the method further includes: receiving, by the terminal, a synchronization signal via the downlink carrier.

In an optional design, the method further includes: sending, by the terminal, data via the second uplink carrier.

In an optional design, the method further includes: receiving, by the terminal, data via the downlink carrier.

In an optional design, the first frequency band and the second frequency band belong to different communications standards.

The uplink frequency band and the downlink frequency band of the terminal may be different under different standards, so that the terminal can use radio resources in different standards, and frequency band resources in a plurality of standards are shared, thereby effectively utilizing the radio resources.

In an optional design, the first frequency band belongs to a Long Term Evolution LTE standard, and the second frequency band belongs to a new radio NR standard; or the first frequency band belongs to a new radio NR standard, and the second frequency band belongs to a Long Term Evolution LTE standard.

In an optional design, the system message further includes information used to indicate a frequency channel number of a first uplink carrier, where the frequency channel number of the first uplink carrier belongs to the first frequency band, and the method further includes: sending, by the terminal via the first uplink carrier, a signal used to measure uplink quality; and measuring the uplink quality via the first uplink carrier, so that the base station can more accurately learn the uplink quality, and perform an uplink switch based on the uplink quality.

In an optional design, the method further includes: receiving, by the terminal, a first message via the downlink carrier, where the first message includes information used to indicate a frequency channel number of a target uplink carrier; and initiating, by the terminal, a switch from the second uplink carrier to the target uplink carrier, where the frequency channel number of the target uplink carrier and the frequency channel number of the second uplink carrier belong to different frequency bands.

After being accessed to a base station, the terminal may initiate the switch from the second uplink carrier to the target uplink carrier. The second uplink carrier and the target uplink carrier may be carriers on different frequency bands, so that the terminal can flexibly switch the uplink carrier to different frequency bands based on the uplink quality or a service requirement.

According to a second aspect of this application, a switch method is provided, including:

receiving, by a terminal, a first message via a first downlink carrier, where the first message includes information used to indicate a frequency channel number of a second uplink carrier, and a frequency channel number of a first uplink carrier and the frequency channel number of the second uplink carrier belong to different frequency bands; initiating, by the terminal, a switch from the first uplink carrier to the second uplink carrier; and receiving, by the terminal, data via the first downlink carrier and sending data via the second uplink carrier, where a frequency channel number of the first downlink carrier and the frequency channel number of the first uplink carrier belong to a same frequency band.

After being accessed to a base station, the terminal can switch from an uplink frequency band to another frequency band while keeping a downlink frequency band unchanged, and can switch to an appropriate frequency band based on an uplink status, so that a radio resource can be effectively utilized. For example, when the terminal is located on an edge of original uplink coverage, uplink quality is relatively poor, and in this case, the terminal can switch from the uplink frequency band to another frequency band, so that the terminal is located in a center of new uplink coverage, thereby improving the uplink quality. When some frequency band resources are not effectively utilized, the terminal may also switch to these frequency bands, to improve utilization of the radio resources.

In an optional design, the method further includes: sending, by the terminal via the second uplink carrier, a second message used to indicate completion of the switch.

In an optional design, the method further includes: receiving, by the terminal, an uplink grant message via the first downlink carrier; and if the switch is completed, sending, by the terminal, data via the second uplink carrier; or if the switch is not completed, sending, by the terminal, data via the first uplink carrier.

In an optional design, the method further includes: sending, by the terminal, a measurement report via the first uplink carrier, where the measurement report is used to indicate quality of the second uplink carrier.

According to a third aspect of this application, a switch method is provided, including:

receiving, by a terminal, a first message via a first downlink carrier, where the first message includes information used to indicate a frequency channel number of a second downlink carrier, and a frequency channel number of the first downlink carrier and the frequency channel number of the second downlink carrier belong to different frequency bands; initiating, by the terminal, a switch from the first downlink carrier to the second downlink carrier; and sending, by the terminal, data via the first uplink carrier and receiving data via the second downlink carrier, where a frequency channel number of the first uplink carrier and the frequency channel number of the first downlink carrier belong to a same frequency band.

In the foregoing implementation, after being accessed to a base station, the terminal can switch to another frequency band, and can switch to an appropriate frequency band based on an uplink status, so that a radio resource can be effectively utilized. For example, when the terminal is located on an edge of original downlink coverage, downlink quality is relatively poor, and in this case, the terminal can switch to another frequency band, so that the terminal is located in a center of new downlink coverage, thereby improving the downlink quality. When some frequency band resources are not effectively utilized, the terminal may also switch to these frequency bands, to improve utilization of the radio resources.

In an optional design, the method further includes: sending, by the terminal via the first uplink carrier, a second message used to indicate completion of the switch.

In an optional design, the method further includes: receiving, by the terminal, an uplink grant message via the second downlink carrier.

In an optional design, the method further includes: receiving, by the terminal, a measurement configuration via the first downlink carrier, where the measurement configuration is used to instruct to measure the second downlink carrier; and sending, by the terminal, a measurement report of the second downlink carrier via the first uplink carrier.

According to a fourth aspect of this application, an access method is provided, including:

sending, by a base station, a system message via a downlink carrier, where the system message includes information used to indicate a frequency channel number of a second uplink carrier; and receiving, by the base station, a random access request via the second uplink carrier; where a frequency channel number of the downlink carrier belongs to a first frequency band, the frequency channel number of the second uplink carrier belongs to a second frequency band, and the first frequency band and the second frequency band are different.

In an optional design, the method further includes: sending, by the base station, a synchronization signal via the downlink carrier.

In an optional design, the method further includes: receiving, by the base station, data via the second uplink carrier.

In an optional design, the method further includes: sending, by the base station, data via the downlink carrier.

In an optional design, the first frequency band and the second frequency band belong to different communications standards.

In an optional design, the first frequency band belongs to a Long Term Evolution LTE standard, and the second frequency band belongs to a new radio NR standard; or the first frequency band belongs to a new radio NR standard, and the second frequency band belongs to a Long Term Evolution LTE standard.

In an optional design, the system message further includes information used to indicate a frequency channel number of a first uplink carrier, where the frequency channel number of the first uplink carrier belongs to the first frequency band, and the method further includes: receiving, by the base station via the first uplink carrier, a signal used to measure uplink quality.

In an optional design, the method further includes: sending, by the base station, a first message via the downlink carrier, where the first message includes information used to indicate a frequency channel number of a target uplink carrier, and the frequency channel number of the target uplink carrier and the frequency channel number of the second uplink carrier belong to different frequency bands.

According to a fifth aspect of this application, a switch method is provided, including:

sending, by a base station, a first message via a first downlink carrier, where the first message includes information used to indicate a frequency channel number of a second uplink carrier, and a frequency channel number of a first uplink carrier and the frequency channel number of the second uplink carrier belong to different frequency bands; receiving, by the base station, a second message on the first uplink carrier, where the second message includes information used to indicate completion of a switch from the first uplink carrier to the second uplink carrier; and sending, by the base station, data via the first downlink carrier and receiving data via the second uplink carrier, where a frequency channel number of the first downlink carrier and the frequency channel number of the first uplink carrier belong to a same frequency band. The information used to indicate completion of the switch from the first uplink carrier to the second uplink carrier is sent by the terminal, and indicates that an uplink carrier switch of the terminal is completed.

In an optional design, the method further includes: sending, by the base station, an uplink grant message via the first downlink carrier; and receiving, by the base station, data via the second uplink carrier.

In an optional design, the method further includes: receiving, by the base station, a measurement report via the first uplink carrier, where the measurement report is used to indicate quality of the second uplink carrier.

According to a sixth aspect of this application, a switch method is provided, including:

sending, by a base station, a first message via a first downlink carrier, where the first message includes information used to indicate a frequency channel number of a second downlink carrier, and a frequency channel number of the first downlink carrier and the frequency channel number of the second downlink carrier belong to different frequency bands; receiving, by the base station, a second message via the first uplink carrier, where the second message includes information used to indicate completion of a switch from the first downlink carrier to the second downlink carrier; and receiving, by the base station, data via the first uplink carrier and sending data via the second downlink carrier, where a frequency channel number of the first uplink carrier and the frequency channel number of the first downlink carrier belong to a same frequency band.

In an optional design, the method further includes: sending, by the base station, an uplink grant message via the second downlink carrier.

In an optional design, the method further includes: sending, by the base station, a measurement configuration via the first downlink carrier, where the measurement configuration is used to instruct to measure the second downlink carrier; and receiving, by the base station, a measurement report of the second downlink carrier via the first uplink carrier.

According to a seventh aspect of the present invention, a communications apparatus is provided, including a processor and a transceiver component, where the processor is configured to receive a system message on a downlink carrier by using a transceiver component, where the system message includes information used to indicate a frequency channel number of a second uplink carrier; and the processor is further configured to initiate random access from the second uplink carrier by using the transceiver component, where a frequency channel number of the downlink carrier belongs to a first frequency band, the frequency channel number of the second uplink carrier belongs to a second frequency band, and the first frequency band and the second frequency band are different.

In an optional design, the processor is further configured to receive a synchronization signal on the downlink carrier by using the transceiver component.

In an optional design, the processor is further configured to send data on the second uplink carrier by using the transceiver component.

In an optional design, the processor is further configured to receive data on the downlink carrier by using the transceiver component.

In an optional design, the first frequency band and the second frequency band belong to different communications standards.

In an optional design, the first frequency band belongs to a Long Term Evolution LTE standard, and the second frequency band belongs to a new radio NR standard; or the first frequency band belongs to a new radio NR standard, and the second frequency band belongs to a Long Term Evolution LTE standard.

In an optional design, the processor is further configured to receive, on the downlink carrier by using the transceiver component, information used to indicate a frequency channel number of a first uplink carrier, where the frequency channel number of the first uplink carrier belongs to the first frequency band; and the processor is further configured to send, on the first uplink carrier by using the transceiver component, a signal used to measure uplink quality.

In an optional design, the processor is further configured to receive a first message on the downlink carrier by using the transceiver component, where the first message includes information used to indicate a frequency channel number of a target uplink carrier; and the processor is further configured to initiate a switch from the second uplink carrier to the target uplink carrier, where the frequency channel number of the target uplink carrier and the frequency channel number of the second uplink carrier belong to different frequency bands.

In an optional design, the foregoing apparatus is a terminal or a chip.

According to an eighth aspect of the present invention, a communications apparatus is provided, including a processor and a transceiver component, where the transceiver component is configured to receive a first message via a first downlink carrier, where the first message includes information used to indicate a frequency channel number of a second uplink carrier, and a frequency channel number of a first uplink carrier and the frequency channel number of the second uplink carrier belong to different frequency bands; the processor is further configured to initiate a switch from the first uplink carrier to the second uplink carrier; and the processor is further configured to receive data on the first downlink carrier by using the transceiver component, and send data on the second uplink carrier, where a frequency channel number of the first downlink carrier and the frequency channel number of the first uplink carrier belong to a same frequency band.

In an optional design, the processor is further configured to send, on the second uplink carrier by using the transceiver component, a second message used to indicate completion of the switch.

In an optional design, the processor is further configured to receive an uplink grant message on the first downlink carrier by using the transceiver component; and if the switch is completed, the processor is further configured to send data on the second uplink carrier by using the transceiver component; or if the switch is not completed, the processor is further configured to send data on the first uplink carrier by using the transceiver component.

In an optional design, the processor is further configured to send a measurement report on the first uplink carrier by using the transceiver component, where the measurement report is used to indicate quality of the second uplink carrier.

In an optional design, the foregoing apparatus is a terminal or a chip.

According to a ninth aspect of the present invention, a communications apparatus is provided, including a processor and a transceiver component, where the transceiver component is configured to receive a first message via a first downlink carrier, where the first message includes information used to indicate a frequency channel number of a second downlink carrier, and a frequency channel number of the first downlink carrier and the frequency channel number of the second downlink carrier belong to different frequency bands; the processor is further configured to initiate a switch from the first downlink carrier to the second downlink carrier; and the processor is further configured to send data on the first uplink carrier by using the transceiver component, and receive data via the second downlink carrier, where a frequency channel number of the first uplink carrier and the frequency channel number of the first downlink carrier belong to a same frequency band.

In an optional design, the processor is further configured to send, on the first uplink carrier by using the transceiver component, a second message used to indicate completion of the switch.

In an optional design, the processor is further configured to receive an uplink grant message on the second downlink carrier by using the transceiver component.

In an optional design, the processor is further configured to receive a measurement configuration on the first downlink carrier by using the transceiver component, where the measurement configuration is used to instruct to measure the second downlink carrier; and the processor is further configured to send, on the first uplink carrier, a measurement report of the second downlink carrier by using the transceiver component.

In an optional design, the foregoing apparatus is a terminal or a chip.

According to a tenth aspect of the present invention, a communications apparatus is provided, including a processor and a transceiver component, where the transceiver component is configured to send a system message via a downlink carrier, where the system message includes information used to indicate a frequency channel number of a second uplink carrier; and the processor is further configured to receive a random access request on the second uplink carrier by using the transceiver component, where a frequency channel number of the downlink carrier belongs to a first frequency band, the frequency channel number of the second uplink carrier belongs to a second frequency band, and the first frequency band and the second frequency band are different.

In an optional design, the processor is further configured to send a synchronization signal on the downlink carrier by using the transceiver component.

In an optional design, the processor is further configured to receive data on the second uplink carrier by using the transceiver component.

In an optional design, the processor is further configured to send data on the downlink carrier by using the transceiver component.

In an optional design, the first frequency band and the second frequency band belong to different communications standards.

In an optional design, the first frequency band belongs to a Long Term Evolution LTE standard, and the second frequency band belongs to a new radio NR standard; or the first frequency band belongs to a new radio NR standard, and the second frequency band belongs to a Long Term Evolution LTE standard.

In an optional design, the system message further includes information used to indicate a frequency channel number of a first uplink carrier, where the frequency channel number of the first uplink carrier belongs to a first frequency band, and the processor is further configured to receive, on the first uplink carrier by using the transceiver component, a signal used to measure uplink quality.

In an optional design, the processor is further configured to send a first message on the downlink carrier by using the transceiver component, where the first message includes information used to indicate a frequency channel number of a target uplink carrier, and the frequency channel number of the target uplink carrier and the frequency channel number of the second uplink carrier belong to different frequency bands.

In an optional design, the foregoing apparatus is a base station or a chip.

According to an eleventh aspect of the present invention, a communications apparatus is provided, including a processor and a transceiver component, where the transceiver component is configured to send a first message via a first downlink carrier, where the first message includes information used to indicate a frequency channel number of a second uplink carrier, and a frequency channel number of a first uplink carrier and the frequency channel number of the second uplink carrier belong to different frequency bands; the processor is further configured to receive a second message on the first uplink carrier by using the transceiver component, where the second message includes information used to indicate completion of a switch from the first uplink carrier to the second uplink carrier; and the processor is further configured to send data on the first downlink carrier by using the transceiver component, and receive data via the second uplink carrier, where a frequency channel number of the first downlink carrier and the frequency channel number of the first uplink carrier belong to a same frequency band. The information used to indicate completion of the switch from the first uplink carrier to the second uplink carrier is sent by another communications apparatus, and indicates that an uplink carrier switch of the another communications apparatus is completed.

In an optional design, the processor is further configured to send, to the base station, an uplink grant message on the first downlink carrier by using the transceiver component;

and the base station receives data via the second uplink carrier.

In an optional design, the processor is further configured to receive a measurement report on the first uplink carrier by using the transceiver component, where the measurement report is used to indicate quality of the second uplink carrier.

In an optional design, the foregoing apparatus is a base station or a chip.

According to a twelfth aspect of the present invention, a communications apparatus is provided, including a processor and a transceiver component, where the transceiver component is configured to send a first message via a first downlink carrier, where the first message includes information used to indicate a frequency channel number of a second downlink carrier, and a frequency channel number of the first downlink carrier and the frequency channel number of the second downlink carrier belong to different frequency bands; the processor is further configured to receive a second message on a first uplink carrier by using the transceiver component, where the second message includes information used to indicate completion of a switch from the first downlink carrier to the second downlink carrier; and the transceiver component is further configured to receive data via the first uplink carrier and send data via the second downlink carrier, where a frequency channel number of the first uplink carrier and the frequency channel number of the first downlink carrier belong to a same frequency band.

In an optional design, the transceiver component is further configured to send an uplink grant message via the second downlink carrier.

In an optional design, the transceiver component is further configured to send a measurement configuration via the first downlink carrier, where the measurement configuration is used to instruct to measure the second downlink carrier; and the transceiver component is further configured to receive a measurement report of the second downlink carrier via the first uplink carrier.

In an optional design, the foregoing apparatus is a base station or a chip.

According to a thirteenth aspect of the present invention, a computer program product is provided, where the program product includes a program, and when the program is run, the method in the first aspect to the sixth aspect is performed.

According to a fourteenth aspect of the present invention, a computer readable storage medium is provided, where the computer readable storage medium stores a program, and when the program is run, the method in the first aspect to the sixth aspect is performed.

According to a fifteenth aspect of the present invention, a communications apparatus is provided, including a processor and a memory, where the memory stores a program, and the processor may run the program, so that the method in the first aspect to the sixth aspect is performed.

BRIEF DESCRIPTION OF DRAWINGS

To describe this application more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DETAILED DESCRIPTION OF EMBODIMENTS

The following describes technical solutions in this application with reference to accompanying drawings.

Figure 1:
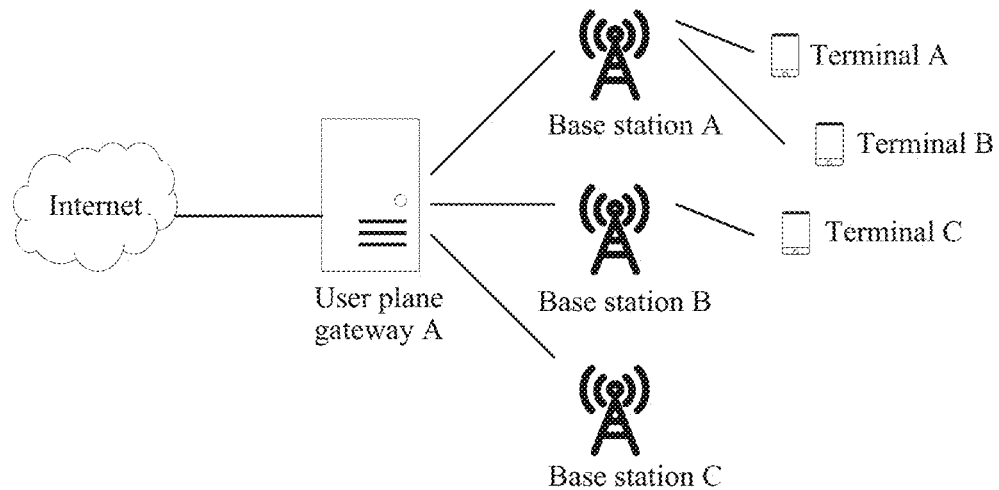
FIG. 1 is a schematic diagram of a wireless communications system according to this application.

FIG. 1 is a schematic diagram of a wireless communications system. As shown in FIG. 1, the wireless communications system includes a core network device (for example, a user plane gateway A) and a plurality of access network devices (for example, a base station A, a base station B, and a base station C). The plurality of access network devices is connected to the core network device. The wireless communications system may be a communications system that supports a 4G access technology, for example, a long term evolution (LTE) access technology; or may be a communications system that supports a 5G access technology, for example, a new radio (NR) access technology; or may be a communications system that supports a 3G access technology, for example, a universal mobile telecommunications system (UMTS) access technology; or may be a communications system that supports a variety of wireless technologies, for example, a communications system that supports an LTE technology and an NR technology. A terminal (for example, terminal A, terminal B. and terminal C) may wirelessly communicate, by using a corresponding access technology, with the wireless communications system shown in FIG. 1.

A base station in this application is an apparatus that is deployed in a radio access network and that is configured to provide a wireless communication function for a terminal. The base station may include a macro base station, a micro base station (also referred to as a small cell), a relay station, an access point, or the like in various forms. In systems using different radio access technologies, names of devices that have functions of a base station may vary. For ease of description, in this application, all the foregoing apparatuses that provide a wireless communication function for the terminal are collectively referred to as base stations.

A terminal in this application may also be referred to as a mobile station (MS), a terminal equipment ( ), and may further include a subscriber unit ( ), a cellular phone ( ), a smartphone ( ), a wireless data card, a personal digital assistant (, PDA) computer, a tablet computer, a wireless modem (modem), a handheld (handheld) device, a laptop computer, a cordless phone, or a wireless local loop (WLL) station, a machine type communication (MTC) terminal, or the like. For ease of description, in this application, the devices mentioned above are collectively referred to as terminals.

Table 1 shows an example of frequency band division. As shown in Table 1, in a frequency division duplex (FDD) mode, one frequency band includes two frequency ranges. For example, a frequency band 3 includes 1710-1785 megahertz (MHz) and 1805-1880 MHz, where 1710-1785 MHz is available for uplink transmission, and 1805-1880 MHz is available for downlink transmission. An operator may configure a plurality of frequency band resources for the foregoing wireless communications system. For example, an operator A may configure a frequency band 3, a frequency band 8, and a frequency band 42 for the foregoing wireless communications system, where 1710-1785 MHz of the frequency band 3 is configured for uplink transmission, 1805-1880 MHz of the frequency band 3 is configured for downlink transmission, 880-915 MHz of the frequency band 8 is configured for uplink transmission, 925-960 MHz of the frequency band 8 is configured for downlink transmission, 3400-3600 MHz of the frequency band 42 is configured for uplink transmission, and 3400-3600 MHz of the frequency band 42 is configured for downlink transmission. The frequency band 3 is also referred to as a 1.8 GHz frequency band, the frequency band 8 is also referred to as a 0.9 GHz frequency band, and the frequency band 42 is also referred to as a 3.5 GHz frequency band.

TABLE 1

| Frequency band | Frequency band range | Network standard |
| --- | --- | --- |
| Frequency band 1 | Uplink: 1920-1980 MHz<br>Downlink: 2110-2170 MHz | LTE FDD, and WCDMA |
| Frequency band 2 | Uplink: 1850-1910 MHz<br>Downlink: 1930-1990 MHz | GSM and WCDMA |
| Frequency band 3 | Uplink: 1710-1785 MHz<br>Downlink: 1805-1880 MHz | LTE FDD and GSM |
| Frequency band 4 | Uplink: 1710-1755 MHz<br>Downlink: 2110-2155 MHz | LTE FDD |
| ... | | |
| Frequency band 8 | Uplink: 880-915 MHz<br>Downlink: 925-960 MHz | GSM |
| ... | | |
| Frequency band 34 | 2010-2025 MHz | TD-LTE and TD-SCDMA |
| ... | | |
| Frequency band 42 | 3400-3600 MHz | TD-LTE |

Figure 2:
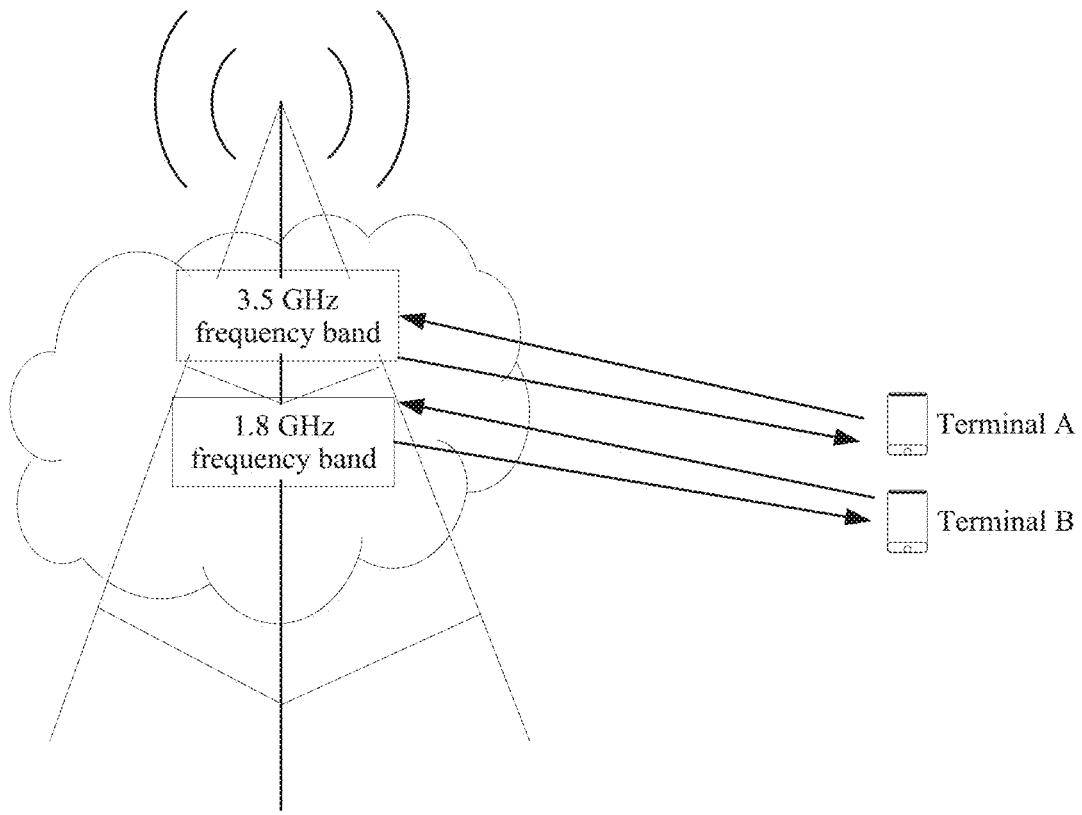
FIG. 2 is a schematic diagram of a network scenario according to this application.

In the foregoing scenario, as shown in FIG. 2, the access network device and the terminal in FIG. 1 may work on a plurality of frequency bands. For example, a terminal A communicates with a base station A on a 3.5 GHz frequency band, and a terminal B communicates with a base station B on a 1.8 GHz frequency band. Specifically, the terminal A sends data to the base station A via an uplink subcarrier on the 3.5 GHz frequency band, and the base station A sends data to the terminal A via a downlink subcarrier A of the 3.5 GHz frequency band; and the terminal B sends data to the base station A via an uplink subcarrier on the 1.8 GHz frequency band, and the base station A sends data to the terminal B via a downlink subcarrier B of the 1.8 GHz frequency band.

An uplink sub-band and a downlink sub-band in a same frequency band are relatively close to each other in terms of frequency band. Theoretically, uplink coverage and downlink coverage of a same frequency band are relatively close to each other in terms of range. However, because of such factors as path loss, and different transmit powers of an access network device and a terminal device, the uplink coverage is usually smaller than the downlink coverage. Due to the foregoing reason, at an edge of downlink coverage, the uplink coverage may be relatively small, resulting in poor effect of uplink transmission by a terminal.

Figure 3A:
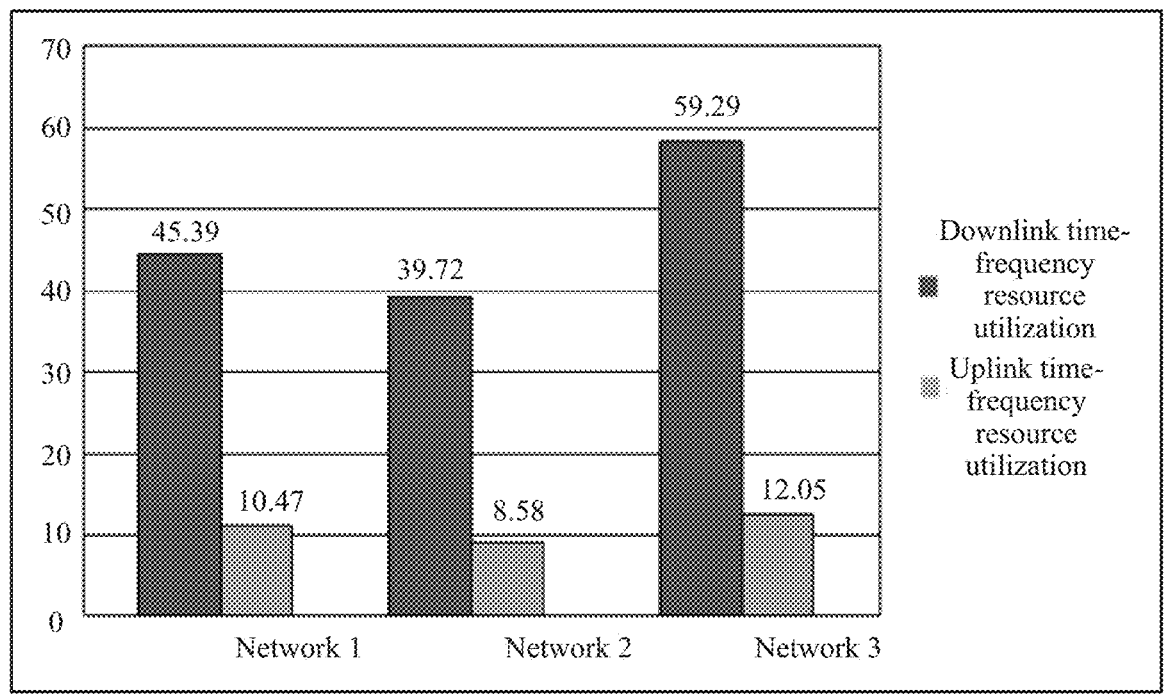
FIG. 3a is a schematic diagram of radio resource utilization according to this application.

In addition, FIG. 3a is a schematic diagram of utilization of radio resources. As shown in FIG. 3a, utilization of a downlink time-frequency resource is usually no more than 60%, and utilization of an uplink time-frequency resource is usually no more than 15%. It can be learned that utilization of the radio resources, especially utilization of a radio resource used for uplink transmission is relatively low.

To improve the foregoing conditions, this application provides a solution to use radio resources more effectively.

Figure 3:
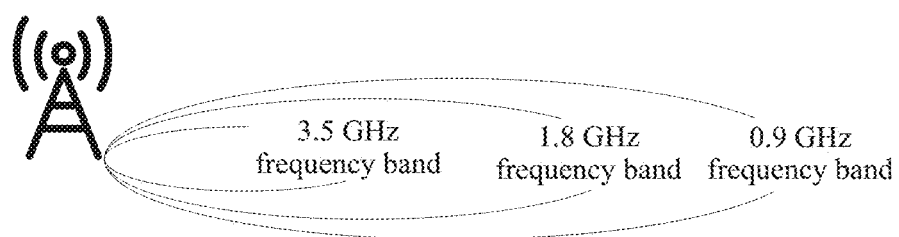
FIG. 3 is a schematic diagram of coverage of a frequency band according to this application.

As shown in FIG. 3, different frequency bands are different in coverage. Usually, a low frequency band has large coverage. For example, the coverage of the 1.8 GHz frequency band is larger than the coverage of the 3.5 GHz frequency band, and the coverage of the 0.9 GHz frequency band is larger than the coverage of the 1.8 GHz frequency band.

Figure 4:
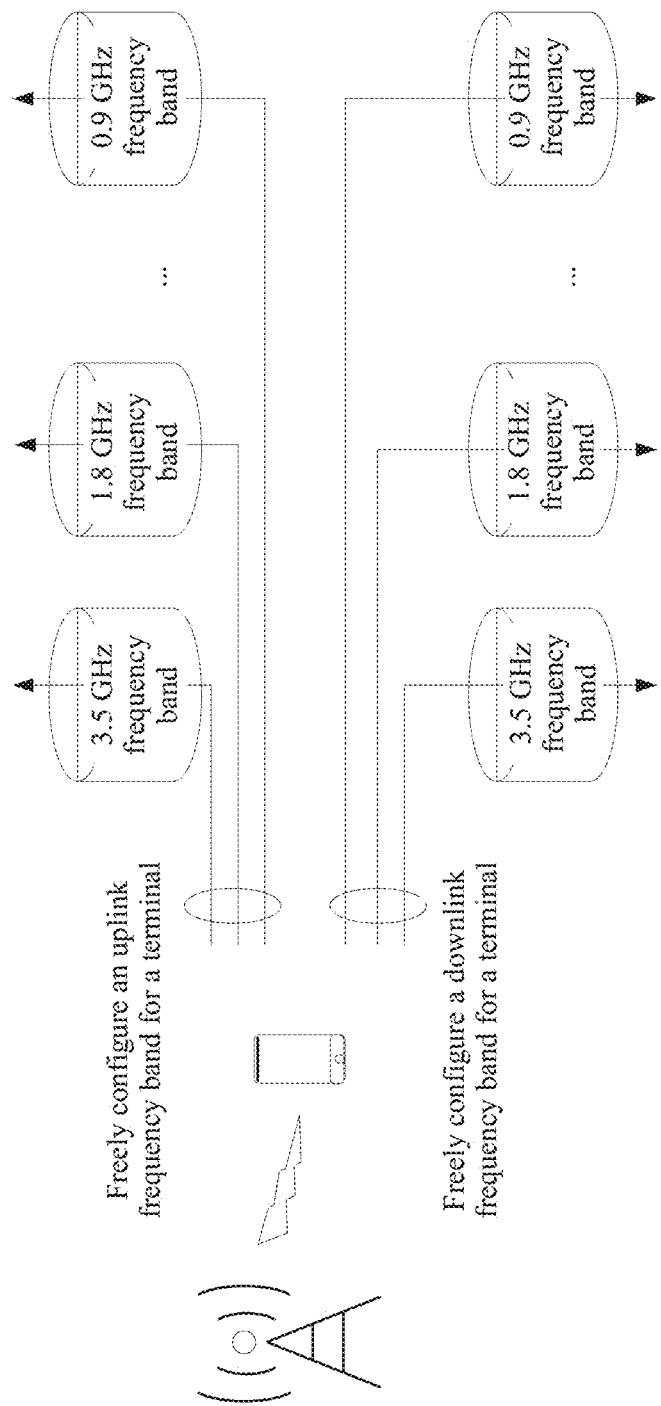
FIG. 4 is a schematic diagram of a solution according to this application.

Considering the foregoing frequency characteristic, in the solution provided in this application, as shown in FIG. 4, it may be considered that a frequency band used for uplink transmission and a frequency band used for downlink transmission may be decoupled, in other words, the frequency band used for uplink transmission and the frequency band used for downlink transmission may be different. For example, the 3.5 GHz frequency band is used for the downlink transmission of a terminal A, and the 1.8 GHz frequency band is used for the uplink transmission of the terminal A.

Figure 5:
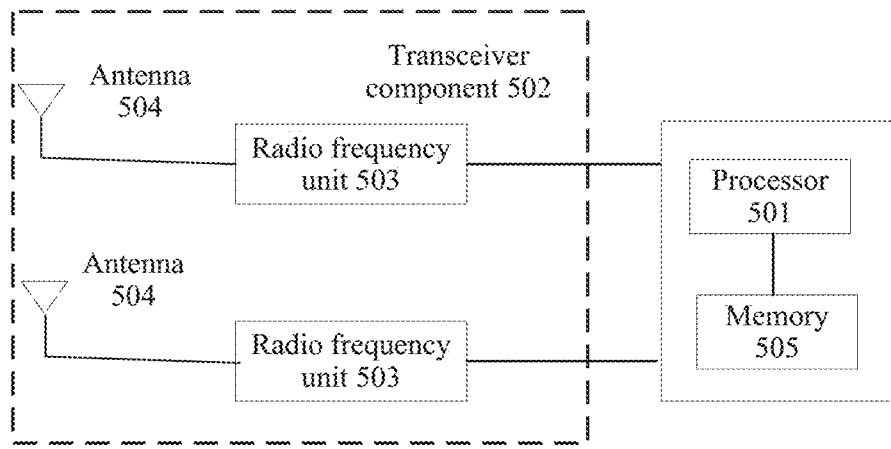
FIG. 5 is a schematic structural diagram of a base station A according to this application.

In this solution, a base station A may support coordinated processing of uplink data and downlink data of different frequency bands. As shown in FIG. 5, the base station A includes a processor 501 and a transceiver component 502. The processor 501 is mainly configured to process a baseband signal, control a base station, and the like, and can process and distribute data on different frequency bands of a same terminal A. For example, the processor can generate an uplink grant, instruct the transceiver component to send the uplink grant to the terminal A via a downlink carrier on the 3.5 GHz frequency band, instruct the transceiver component 502 to receive, from the terminal A via an uplink carrier on the 1.8 GHz frequency band, data that is used to respond to the uplink grant, and perform corresponding processing. The transceiver component 502 is mainly configured to receive and send a radio frequency signal and perform conversion between the radio frequency signal and the baseband signal. The processor 501 may be usually referred to as a processing unit, a baseband unit, or the like, and a 501 part is usually a control center of the base station.

The transceiver component 502 may be usually referred to as a transceiver unit, a transceiver, a transceiver circuit, a transceiver machine, or the like.

Figure 6:
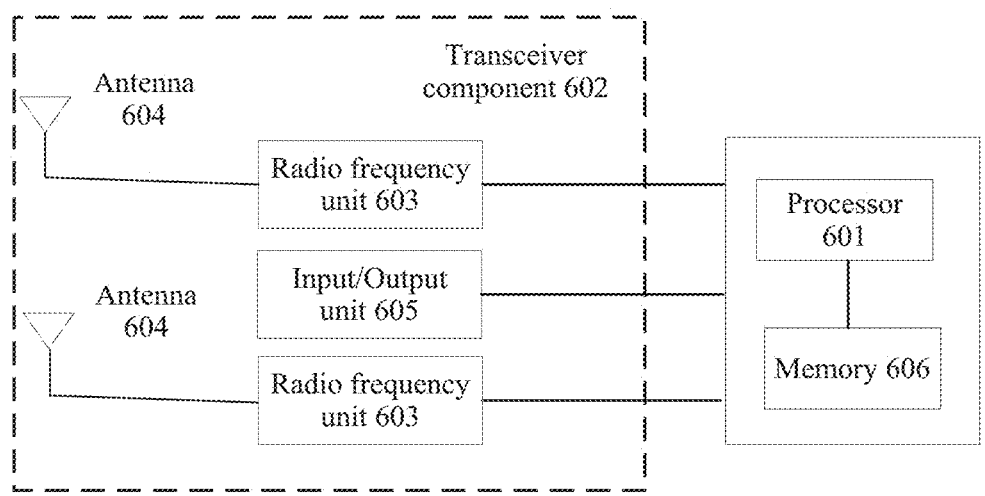
FIG. 6 is another schematic structural diagram of a terminal A according to this application.

In this solution, the terminal A may support coordinated processing of uplink data and downlink data of different frequency bands. As shown in FIG. 6, a terminal A includes a processor 601 and a transceiver component 602. The processor 601 can process and distribute data on different frequency bands of a same access network device. For example, the processor 601 can receive the downlink data via a downlink carrier on a 3.5 GHz frequency band and process the data, and then send to-be-sent data on the uplink carrier on the 1.8 GHz frequency band by using the transceiver component 602. The transceiver component 602 is mainly configured to receive and send a radio frequency signal and perform conversion between the radio frequency signal and a baseband signal. The processor 601 may be usually referred to as a processing unit, a baseband unit, or the like, and a 601 part is usually a control center of the terminal. The transceiver component 602 may be usually referred to as a transceiver unit, a transceiver, a transceiver circuit, a transceiver, or the like.

Figure 7:
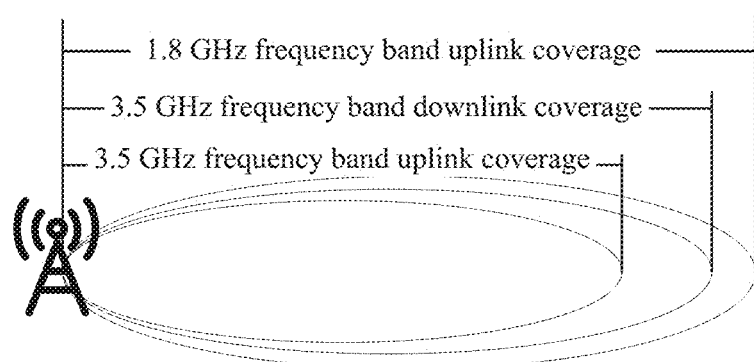
FIG. 7 is another schematic diagram of coverage of a frequency band according to this application.

In the foregoing solutions, the uplink frequency band of the terminal A and the base station may be different from the downlink frequency band of the terminal and the base station A. As shown in FIG. 7, if the 1.8 GHz frequency band is used for uplink transmission and the 3.5 GHz frequency band is used for downlink transmission, because uplink coverage of the 1.8 GHz frequency band is larger than uplink coverage of the 3.5 GHz frequency band, the uplink coverage may be effectively increased, to achieve a relatively good uplink transmission effect. In the solutions, the uplink coverage is increased while different frequency bands are effectively utilized, so that radio resources are effectively utilized.

To implement the foregoing solutions, this application provides the following a plurality of implementations.

Figure 8:
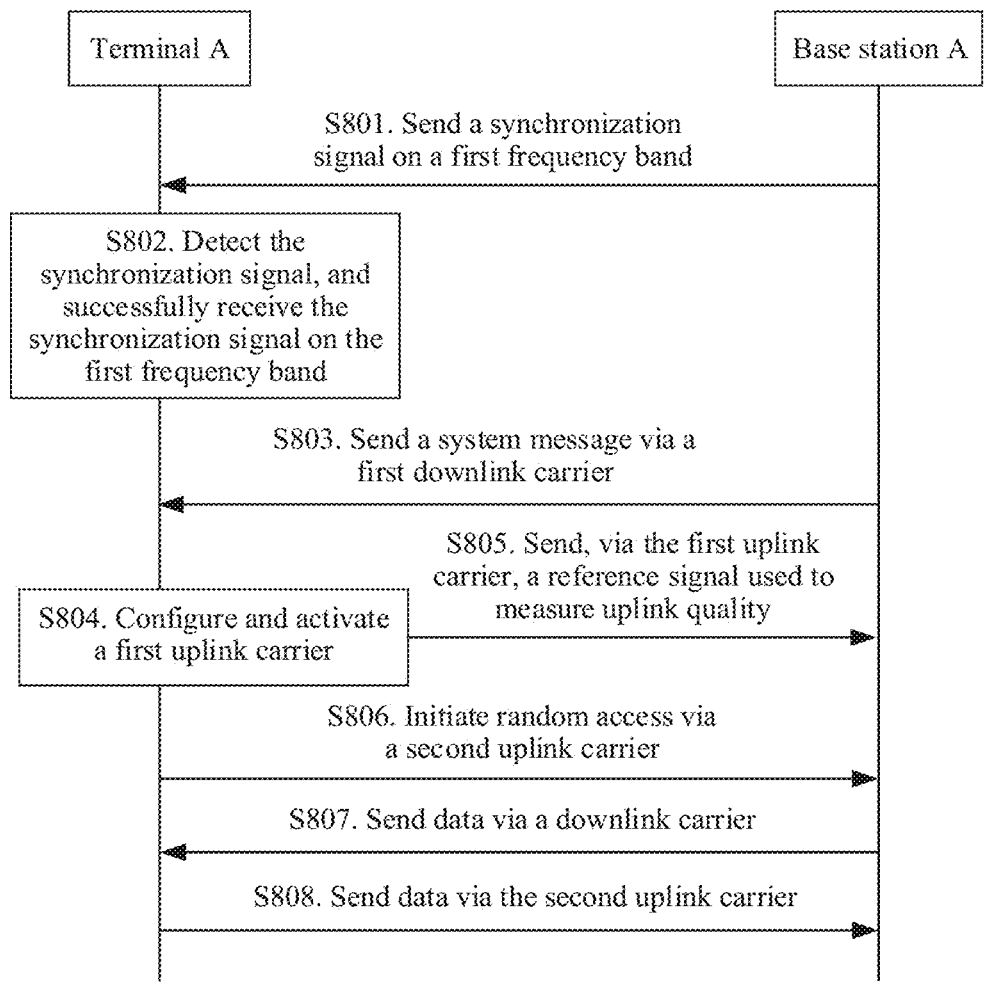
FIG. 8 is a flowchart of an access method according to this application.

As shown in FIG. 8, this application provides an access method, so that when a terminal A is accessed to a base station, an uplink frequency band and a downlink frequency band may be different. The method includes the following steps:

S801. A base station A sends a synchronization signal on a first frequency band.

For example, the first frequency band may be a 3.5 GHz frequency band.

For example, the base station A sends a synchronization signal based on a period of five milliseconds (ms). The synchronization signal may be a primary synchronization signal (PSS) or a secondary synchronization signal (SSS).

S802. The terminal A detects the synchronization signal, and successfully receives the synchronization signal on the first frequency band.

When being powered on, the terminal A may attempt to receive the synchronization signal at a center frequency channel number of a frequency band supported by the terminal A. After successfully receiving the synchronization signal, the terminal A may learn that a current frequency band is the first frequency band and may learn a frequency channel number of a downlink carrier of the first frequency band (referred to as a first downlink carrier).

S803. The terminal A receives, via the first downlink carrier, a system message sent by the base station A.

For example, the terminal A receives, via the downlink carrier on the 3.5 GHz frequency band, a system message sent by the base station A.

The system message includes information used to indicate a frequency channel number of an uplink carrier (referred to as second uplink frequency channel number information). The uplink carrier is an uplink carrier of a second frequency band (referred to as a second uplink carrier). The first frequency band and the second frequency band are different. For example, the second frequency band may be a 1.8 GHz frequency band.

In an example, a system information block 2 (SIB2) may be used to carry the second uplink frequency information. Optionally, a preamble resource information that can be sent via the second uplink carrier may be carried in a parameter RACH-ConfigCommon of the SIB2, and the base station A may identify, by using the preamble resource, the terminal A whose uplink frequency band and downlink frequency band are different. For example, the preamble1 resource is carried in the parameter RACH-ConfigCommon of the SIB2 and is sent via the uplink carrier on the 1.8 GHz frequency band, and after receiving the preamble1 resource, the base station A may identify the terminal A that uses the uplink carrier on the 1.8 GHz frequency band. A time-frequency resource of a random access channel (PRACH) of the uplink carrier may be configured by parameters prach-ConfigIndex and prach-FrequencyOffset of the SIB2. For sending of the system message, refer to related content in, for example, Section 5.2 of 3GPP TS 36.331 V 14.2.2.

In an optional design, the terminal A is a first-type terminal, and the second uplink carrier may be further used by another type of terminal to transmit data, for example, a second-type terminal B. For example, both the terminal A and the terminal B use the uplink carrier on the 1.8 GHz frequency band, but the terminal A uses the downlink carrier on the 3.5 GHz frequency band, while the terminal B uses the downlink carrier on the 1.8 GHz frequency band. When the terminal A and the terminal B initiate random access via the second uplink carrier, to enable the base station A to distinguish between different terminals to make different random access responses (RAR), in S803, system messages sent by the base station A via different downlink carriers may include different information used to indicate a frequency channel number of the uplink carrier. Optionally, preamble resources are different, or PRACH time-frequency resources are different. For example, information that is sent by the base station A via the downlink carrier on the 3.5 GHz frequency band and that is used to indicate the frequency channel number of the uplink carrier includes the preamble1 resource, and information that is sent by the base station A via the downlink carrier on the 1.8 GHz frequency band and that is used to indicate the frequency channel number of the uplink carrier includes a preamble2 resource. Alternatively, information that is sent by the base station A via the downlink carrier on the 3.5 GHz frequency band and that is used to indicate the frequency channel number of the uplink carrier includes a PRACH1 resource, and information that is sent by the base station A via the downlink carrier on the 1.8 GHz frequency band and that is used to indicate the frequency channel number of the uplink carrier includes a PRACH2 resource.

In an optional design, the system message in S803 further includes information used to indicate the frequency channel number of the uplink carrier (referred to as a first uplink carrier) of the first frequency band (referred to as first uplink frequency channel number information). For example, the system message further includes the information used to indicate the frequency channel number of the uplink carrier on the 3.5 GHz frequency band. For example, a system information block 3 (SIB3) may be used to carry the first uplink frequency channel number information.

In this design, the method further includes S804 and S805.

S804. The terminal A configures and activates the first uplink carrier.

The terminal A configures and activates the first uplink carrier based on the first uplink frequency information, for example, configures and activates the uplink carrier on the 3.5 GHz frequency band.

S805. The terminal A sends, via the first uplink carrier, a reference signal used to measure uplink quality.

The reference signal includes a channel sounding reference signal (SRS), and the SRS includes a periodic SRS and an aperiodic SRS. The SRS is used for uplink quality measurement, so that the uplink carriers can be flexibly switched based on the uplink quality, thereby effectively utilizing the radio resources. For example, the terminal A sends an SRS signal via the first uplink carrier. If channel quality of the first uplink carrier is relatively good, for example, the channel quality exceeds a threshold, a switch from the second uplink carrier to the first uplink carrier may be initiated. Optionally, if the channel quality of the second uplink carrier deteriorates due to a reason such as a location change of the terminal A, the switch from the second uplink carrier to the first uplink carrier may also be initiated.

S806. The terminal A initiates random access via the second uplink carrier.

The terminal A may initiate the random access. For details, refer to content, for example, in Section 6.3 of 3GPP TS 36.331 V 14.2.2.

In the foregoing implementation, when the terminal A accesses a base station, an uplink frequency band and a downlink frequency band may be different, so that appropriate frequency band resources may be selected, based on an actual network status, for uplink transmission and downlink transmission, thereby effectively utilizing the radio resources. Based on a characteristic that a low frequency band has large coverage, a frequency band resource selected for the uplink carrier may be lower than a frequency band resource selected for the downlink carrier, to increase the uplink coverage, so that the radio resources are effectively utilized. When some frequency band resources are not effectively utilized, the terminal A using another downlink frequency band may be use an uplink frequency band that is not effectively utilized, to improve utilization of the radio resources, so that the radio resource can be effectively utilized.

After the terminal A is accessed to the base station A, the terminal A may receive data from or send data to the base station A, as shown in S807 or S808.

S807. The terminal A receives data via the downlink carrier.

S808. The terminal A sends data via the second uplink carrier.

In an optional design, the first frequency band and the second frequency band belong to different rats. For example, the first frequency band belongs to a Long Term Evolution LTE rat, and the second frequency band belongs to a new radio NR rat; or the first frequency band belongs to a new radio NR rat, and the second frequency band belongs to a Long Term Evolution LTE rat. For example, the first frequency band belongs to the Long Term Evolution LTE rat, and the second frequency band belongs to a global system for mobile communications (GSM) rat; or the first frequency band belongs to a GSM rat, and the second frequency band belongs to the Long Term Evolution LTE rat.

With evolution of a wireless technology, terminals of an old rat are decreasing, and a frequency band resource of the old rat is usually vacant. A vacant frequency band resource in the old rat may be used for another rat. For example, in an LTE communications system, a frequency channel number of a downlink carrier of the terminal A belongs to the 3.5 GHz frequency band in the LTE rat. In this case, in a GSM communications system, a frequency band resource for uplink transmission on the 1.8 GHz frequency band in the GSM rat is vacant, and a frequency of the 1.8 GHz frequency band is lower than a frequency of the 3.5 GHz frequency band. In this way, the downlink carrier of the terminal A is still on the 3.5 GHz frequency band, and uses the 1.8 GHz frequency band in the GSM rat for uplink transmission, so that a frequency band resource in the old rat is reused, and frequency band resources in a plurality of rats are shared, thereby effectively utilizing the radio resources.

Figure 9:
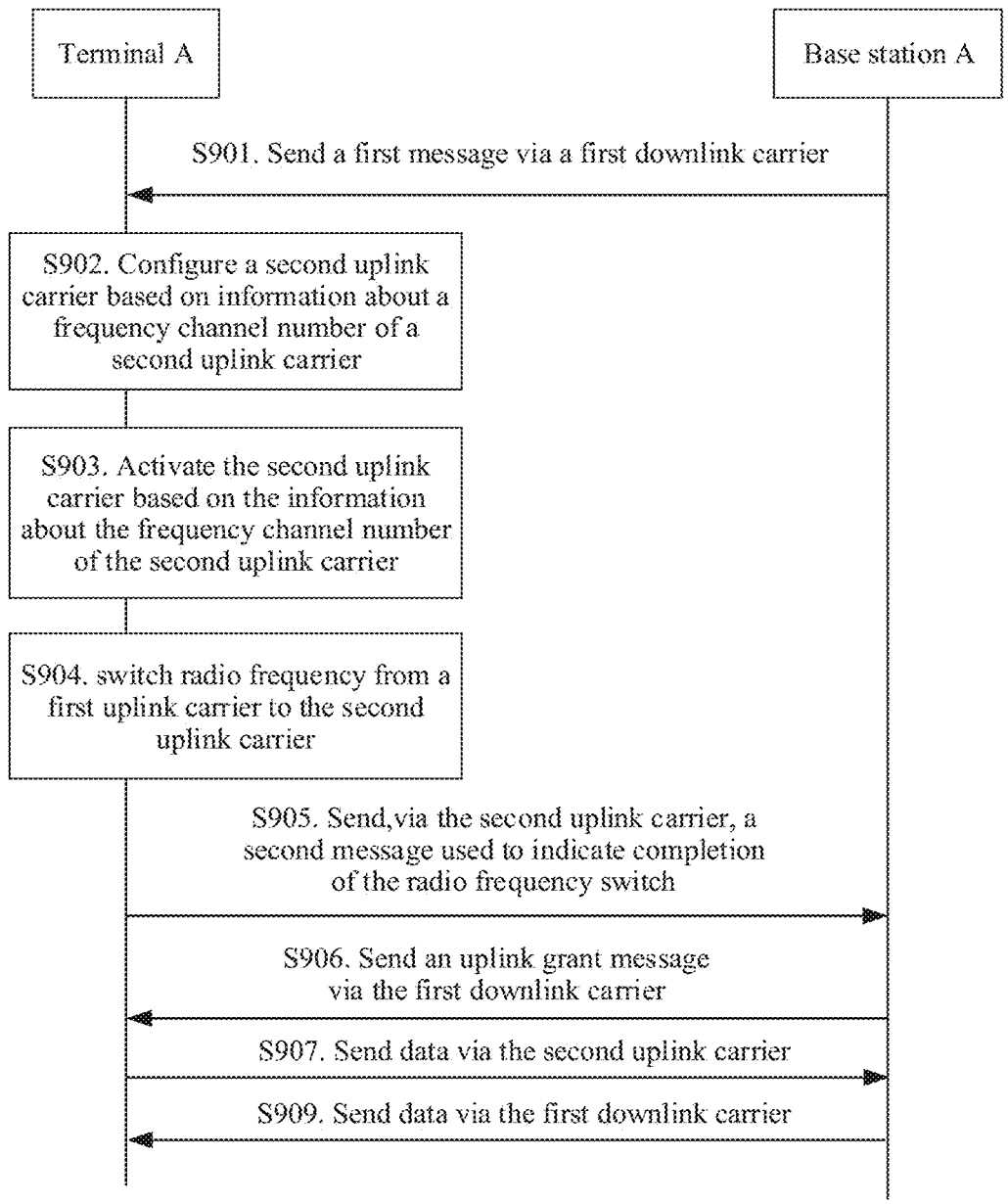
FIG. 9 is a flowchart of an uplink switch method according to this application.

As shown in FIG. 9, this application further provides an uplink switch method. After accessing to a base station, a terminal can switch to another frequency band, and an uplink frequency band and a downlink frequency band of the terminal A may be different. The method includes the following steps:

S901. A base station A sends a first message to a terminal A via a first downlink carrier.

For example, the first downlink carrier is a downlink carrier on a 3.5 GHz frequency band.

The first message includes information used to indicate a frequency channel number of a second uplink carrier. For example, the second uplink carrier is an uplink carrier on a 1.8 GHz frequency band.

The base station A sends the first message based on current uplink signal quality, an uplink load, and an uplink service requirement. For example, a current uplink frequency band and a current downlink frequency band of the terminal A are on the 3.5 GHz frequency band; and when the uplink signal quality of the terminal A is lower than a specific threshold, the uplink load of the terminal A exceeds a specific threshold, or the current uplink quality cannot meet a new service requirement due to a service change of the terminal A, the base station sends the first message to the terminal A via the downlink carrier on the 3.5 GHz frequency band, where the first message includes information about a frequency channel number of the uplink carrier on the 1.8 GHz frequency band.

In an optional design, the information about the frequency channel number of the second uplink carrier further includes information used to activate the second uplink carrier.

In this design, S903 is further included.

S903. The terminal A activates the second uplink carrier based on the information about the frequency channel number of the second uplink carrier.

For example, the terminal A activates the uplink carrier on the 1.8 GHz frequency band based on the information about the frequency channel number of the second uplink carrier, and the activated carrier may be used to send an SRS, where the SRS is used for uplink quality measurement.

In this design, optionally, the information about the frequency channel number of the second uplink carrier further includes information used to configure the second uplink carrier, and the information used to configure the second uplink carrier may be preamble resource information and PRACH time-frequency resource information of the frequency channel number of the second uplink carrier. Optionally, in this design, S902 is further included.

S902. The terminal A configures the second uplink carrier based on the information about the frequency channel number of the second uplink carrier.

For example, the terminal A configures the uplink carrier on the 1.8 GHz frequency band based on the information about the frequency channel number of the second uplink carrier.

In an optional example, the first message is an RRC message, for example, an RRC connection reconfiguration message.

S904. The terminal A switches radio frequency from a first uplink carrier to the second uplink carrier.

A frequency channel number of the second uplink carrier and a frequency channel number of the first uplink carrier belong to different frequency bands. For example, the frequency channel number of the second uplink carrier belongs to the 1.8 GHz frequency band, and the frequency channel number of the first uplink carrier belongs to the 3.5 GHz frequency band.

For example, the terminal A switches the radio frequency from the uplink carrier on the 3.5 GHz frequency band to the uplink carrier on the 1.8 GHz frequency band.

If the radio frequency switch is completed, the design further includes S905 to S907; or if the radio frequency switch is not completed, the design further includes S908.

S905. The terminal A sends, via the second uplink carrier, a second message used to indicate completion of the radio frequency switch.

In an optional example, the second message is an RRC message, for example, an RRC connection reconfiguration completion message.

The base station A receives the second message via the second uplink carrier. If the second message is successfully received, it indicates that the terminal A is switched to the second uplink carrier for uplink transmission, for example, the terminal A is switched to the uplink carrier on the 1.8 GHz frequency band; or if the second message is not received, it indicates that the terminal A still uses the first uplink carrier for uplink transmission, for example, the terminal A still uses the uplink carrier on the 3.5 GHz frequency band for uplink transmission.

S906. The base station A sends an uplink grant (UL GRANT) message to the terminal A via the first downlink carrier.

The uplink grant message includes information used to instruct the terminal A to send data via the second uplink carrier.

The uplink grant message includes information used to instruct the terminal A to send data via the second uplink carrier. For example, the uplink grant message may include information used to instruct the terminal A to send data via the uplink carrier on the 1.8 GHz frequency band. If the uplink grant message is not received, it indicates that the terminal A still uses the first uplink carrier for uplink transmission. The uplink grant message includes information used to instruct the terminal A to send data via the first uplink carrier. For example, the uplink grant message may include information used to instruct the terminal A to send data via the uplink carrier on the 3.5 GHz frequency band.

If the uplink grant message is successfully received, the base station A stops receiving data via the first uplink carrier and receives data via the second uplink carrier. For example, the base station A stops receiving data via the uplink carrier on the 3.5 GHz frequency band, for example, the base station A stops receiving data on a physical uplink control channel (PUCCH) and a physical uplink shared channel (PUSCH), but may receive PUCCH and PUSCH data via the uplink carrier on the 1.8 GHz frequency band. If the uplink grant message is not received, the base station A receives data by still using the first uplink carrier. For example, the base station A receives the PUCCH and PUSCH data still via the uplink carrier on the 1.8 GHz frequency band.

S907. The terminal A sends data via the second uplink carrier.

For example, the terminal A sends data via the uplink carrier on the 1.8 GHz frequency band.

S908. The terminal A sends data via the first uplink carrier.

For example, the terminal A sends data via the uplink carrier on the 3.5 GHz frequency band.

S909. The terminal A receives data via the first downlink carrier.

For example, the terminal A receives data via the downlink carrier on the 3.5 GHz frequency band.

If the uplink switch is not completed, the terminal A receives the data via the first downlink carrier; or if the uplink switch is completed, the terminal A keeps the downlink frequency band unchanged, and receives the data still via the first downlink carrier.

In the foregoing implementation, after accessing to a base station, the terminal A can switch to another frequency band, and can switch to an appropriate frequency band based on an uplink status, so that a radio resource can be effectively utilized. For example, when the terminal A is located on an edge of original uplink coverage, uplink quality is relatively poor, and in this case, the terminal A can switch to another frequency band, so that the terminal A is located in a center of new uplink coverage, thereby improving the uplink quality. When some frequency band resources are not effectively utilized, the terminal A may alternatively switch to these frequency bands, to improve utilization of the radio resources.

Figure 10:
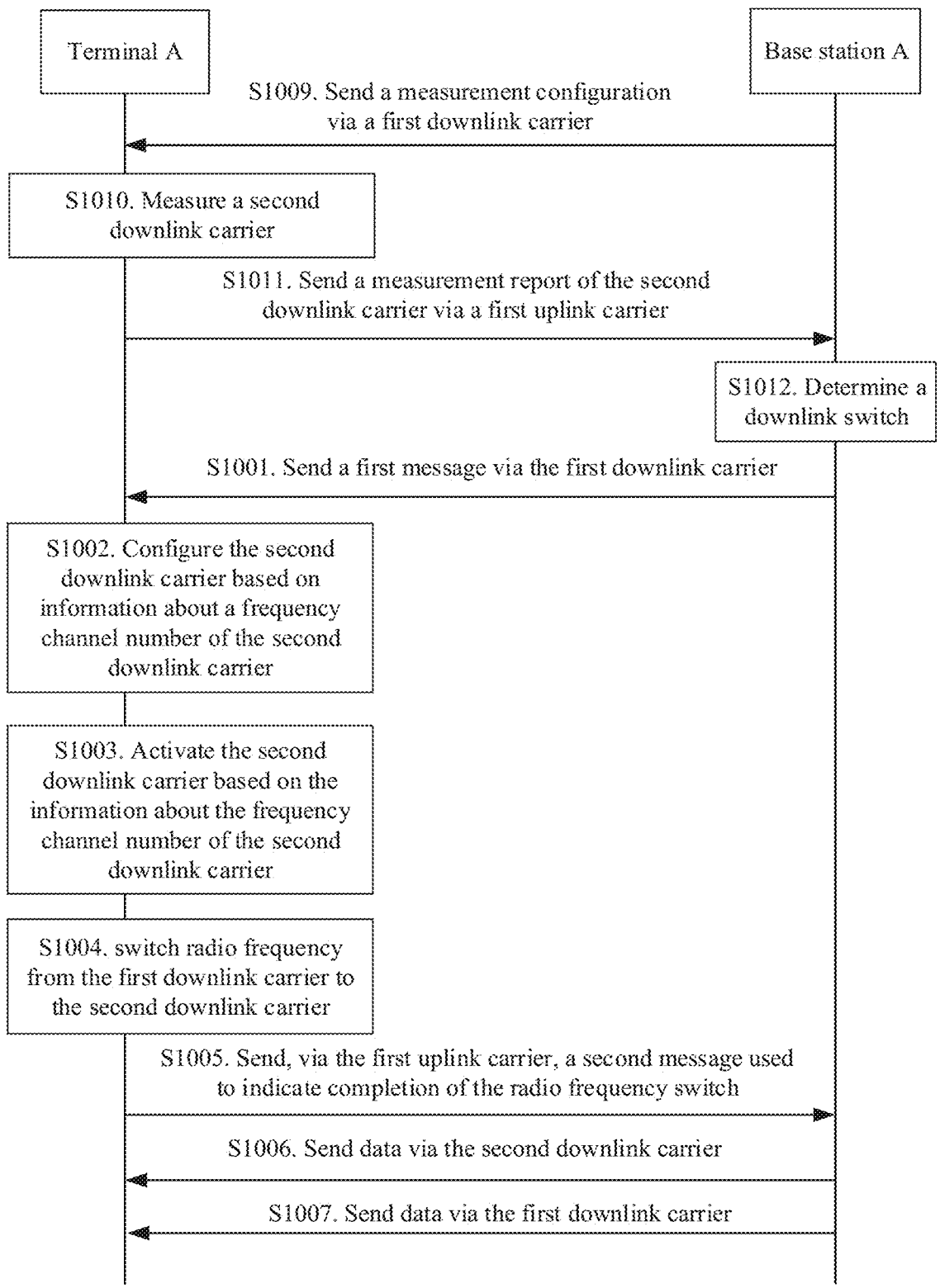
FIG. 10 is a flowchart of a downlink switch method according to this application.

As shown in FIG. 10, this application further provides a downlink switch method. After being accessed to a base station, a terminal A can switch a downlink frequency band to another frequency band, and an uplink frequency band and the downlink frequency band of the terminal A may be different. The method includes:

S1001. A base station A sends a first message to the terminal A via a first downlink carrier.

For example, the first downlink carrier is a downlink carrier on a 3.5 GHz frequency band.

The first message includes information used to indicate a frequency channel number of a second downlink carrier. For example, the second downlink carrier is a downlink carrier on a 1.8 GHz frequency band.

In an optional design, the information about a frequency channel number of the second downlink carrier further includes information used to activate the second downlink carrier.

In this design. S1003 is further included.

S1003. The terminal A activates the second downlink carrier based on the information about the frequency channel number of the second downlink carrier.

For example, the terminal A activates the downlink carrier on the 1.8 GHz frequency band.

In this design, optionally, the information about the frequency channel number of the second downlink carrier further includes information used to configure the second downlink carrier, and the information used to configure the second downlink carrier may be preamble resource information and PRACH time-frequency resource information of the frequency channel number of the second downlink carrier. Optionally, in this design, S1002 is further included.

S1002. The terminal A configures the second downlink carrier based on the information about the frequency channel number of the second downlink carrier.

For example, the terminal A configures the downlink carrier on the 1.8 GHz frequency band based on the information about the frequency channel number of the second downlink carrier.

In an optional example, the first message is an RRC message, for example, an RRC connection reconfiguration message.

S1004. The terminal A switches radio frequency from the first downlink carrier to the second downlink carrier.

A frequency channel number of the second downlink carrier and a frequency channel number of the first downlink carrier belong to different frequency bands. For example, the frequency channel number of the second downlink carrier belongs to the 1.8 GHz frequency band, and the frequency channel number of the first downlink carrier belongs to the 3.5 GHz frequency band.

For example, the terminal A switches the radio frequency from the downlink carrier on the 3.5 GHz frequency band to the downlink carrier on the 1.8 GHz frequency band.

If the radio frequency switch is completed, the design further includes S1005 and S1006; or if the radio frequency switch is not completed, the design further includes S1007.

S1005. The terminal A sends, via a first uplink carrier, a second message used to indicate completion of the radio frequency switch.

In an optional example, the second message is an RRC message, for example, an RRC connection reconfiguration completion message.

The base station A sends, via the first uplink carrier, the second message used to indicate completion of the radio frequency switch. If the second message is successfully received, it indicates that the terminal A is switched to the second downlink carrier for downlink transmission, for example, the terminal A is switched to the downlink carrier on the 1.8 GHz frequency band; or if the second message is not received, it indicates that the terminal A still uses the first downlink carrier for downlink transmission, for example, the terminal A still uses the downlink carrier on the 3.5 GHz frequency band for downlink transmission.

S1006. The base station A stops sending data via the first downlink carrier, and sends data via the second downlink carrier; and the terminal A stops receiving data via the first downlink carrier, and receives data via the second downlink carrier.

For example, the base station A stops sending data to the terminal A via the downlink carrier on the 3.5 GHz frequency band, and sends data to the terminal A via the downlink carrier on the 1.8 GHz frequency band; and the terminal A stops receiving data from the terminal A via the downlink carrier on the 3.5 GHz frequency band, and receives data from the terminal A via the downlink carrier on the 1.8 GHz frequency band.

Optionally, the base station A sends an uplink grant message to the terminal A via the second downlink carrier, where the uplink grant message includes information used to instruct the terminal A to send data via the first uplink carrier.

S1007. The base station A sends data still via the first downlink carrier, and the terminal A receives data still via the first downlink carrier.

Optionally, the base station A sends the uplink grant message to the terminal A via the first downlink carrier, where the uplink grant message includes information used to instruct the terminal A to send data via the first uplink carrier.

S1008. The terminal A sends data via the first uplink carrier. A frequency channel number of the first uplink carrier and a frequency channel number of the first downlink carrier belong to a same frequency band.

For example, the terminal A receives data via the uplink carrier on the 1.8 GHz frequency band.

In an optional design, the design further includes S1009 to S1012.

S1009. The base station A sends a measurement configuration to the terminal A via the first downlink carrier.

The measurement configuration is used to instruct to measure the second downlink carrier.

In an optional design, measurement control may be sent via an RRC connection reconfiguration message.

For example, the base station A sends the measurement configuration to the terminal A via the downlink carrier on the 3.5 GHz frequency band. The measurement configuration is used to instruct to measure the 1.8 GHz downlink carrier.

S1010. The terminal measures the second downlink carrier.

S1011. The terminal A sends a measurement report of the second downlink carrier via the first uplink carrier.

For example, the base station A sends the measurement report of the 1.8 GHz downlink carrier via the uplink carrier on the 1.8 GHz frequency band.

In an optional design, the measurement report may be sent via an RRC connection reconfiguration completion message.

S1012. The base station A determines a downlink switch.

The base station may determine, based on downlink signal quality, a downlink load, a downlink service requirement, downlink coverage, and the like of the second downlink carrier in the measurement report, to switch from the first downlink carrier to the second downlink carrier.

For example, frequency channel numbers of a current uplink carrier and a current downlink carrier of the terminal belong to the 3.5 GHz frequency band, and when the downlink signal quality of the terminal is lower than a specific threshold, or the downlink load of the terminal exceeds a specific threshold, or the current downlink quality cannot meet a new service requirement due to a service change of the terminal, the terminal determines a downlink switch, that is, the terminal determines to initiate a switch from the downlink carrier on the 3.5 GHz frequency band to the downlink carrier on the 1.8 GHz frequency band.

In the foregoing implementation, after being accessed to a base station, the terminal A can switch to another downlink frequency band, and can switch to an appropriate downlink frequency band based on an uplink status, so that a radio resource can be effectively utilized. For example, when the terminal A is located on an edge of original downlink coverage, the downlink quality is relatively poor, and in this case, the terminal A can switch to another frequency band, so that the terminal A is located in a center of new downlink coverage, thereby improving the downlink quality. When some frequency band resources are not effectively utilized, the terminal A may alternatively switch to these downlink frequency bands, to improve utilization of the radio resources.

In addition, the foregoing access and switch methods may be applied to future-oriented communications technologies. System architectures and service scenarios described in this application are intended to more clearly describe the technical solutions in this application, and do not constitute a limitation on the technical solutions provided in this application. A person of ordinary skill in the art may learn that, as the system architectures evolve and a new service scenario emerges, the technical solutions provided in this application are also applicable to similar technical problems.

This application may further provide a communications apparatus, configured to implement the access method on the base station side shown in FIG. 8, or the uplink switch method on the base station side shown in FIG. 9, or the downlink switch method on the base station side shown in FIG. 10.

In a first optional design, the communications apparatus includes a processor and a transceiver component. The transceiver component may send or receive data to implement the access or switch method on the base station side. The processor is configured to run the foregoing program to implement the access or switch method on the base station side.

In this design, optionally, the communications apparatus may further include a memory, where the memory is configured to store a program for implementing the access or switch method on the base station side.

In this design, the communications apparatus may be a base station or a chip, where the chip may be a baseband chip. If the communications apparatus is a base station, the transceiver component may be a transceiver; or if the communications apparatus is a chip, the transceiver component may be an input/output circuit of the chip. The base station may be the foregoing base station A. The schematic structural diagram of the base station and the chip may be shown in FIG. 5.

Optionally, the transceiver component 502 includes a radio frequency unit 503 and an antenna 504, where the radio frequency unit 503 is mainly configured to convert and process a baseband signal and a radio frequency signal, and the antenna 504 is mainly configured to transmit and receive a radio frequency signal.

Optionally, the base station may further include a memory 505, where the memory 505 is configured to store data and a program of a related function, and the processor 501 is configured to read the data in the memory 505 and execute the program in the memory 505 to implement the related function. The memory 505 may also be referred to as a storage medium, a storage device, or the like. The memory 505 and the processor 501 may be integrated in one board. The base station A may have a plurality of processors 501 and a plurality of memories 505.

In a second optional design, the communications apparatus includes a receiving unit, a sending unit, and a processing unit. A component that implements a receiving function in the transceiver component in the first optional design may be considered as the receiving unit, a component that implements a sending function in the transceiver component may be considered as the sending unit, and a processor is considered as the processing unit. The receiving unit may be usually referred to as a receiver, a receiver machine, or a receiver circuit. Correspondingly, the sending unit may be usually referred to as a transmitter, a transmitter machine, or a transmitter circuit.

Optionally, in this design, the communications apparatus includes a storage unit. The memory in the first optional design may be considered as the storage unit.

This application may further provide a communications apparatus, configured to implement the access method on the terminal side shown in FIG. 8, or the switch method on the terminal side shown in FIG. 9, or the switch method on the terminal side shown in FIG. 10.

In a first optional design, the communications apparatus includes a processor and a transceiver component. The transceiver component may send or receive data to implement the access or switch method on the terminal side. The processor is configured to run the foregoing program to implement the access or switch method on the terminal side.

In this design, optionally, the communications apparatus includes a processor. Optionally, the communications apparatus may further include a memory, where the memory is configured to store a program for implementing the access or switch method on the terminal side.

In this design, the communications apparatus may be a terminal or a chip, where the chip may be a baseband chip. If the communications apparatus is a terminal, the transceiver component may be a transceiver; or if the communications apparatus is a chip, the transceiver component may be an input/output circuit of the chip. The terminal is the foregoing terminal A. The schematic structural diagram of the terminal and the chip may be shown in FIG. 5.

Optionally, the transceiver component 602 includes a radio frequency unit 603 and an antenna 604, where the radio frequency unit 603 is mainly configured to convert and process a baseband signal and a radio frequency signal, and the antenna 604 is mainly configured to transmit and receive a radio frequency signal.

Optionally, the terminal further includes an input/output device 605, where the input/output device 605, for example, a touchscreen, a display screen, or a keyboard, is mainly configured to receive data input by a user and output data to the user.

Optionally, the terminal further includes a memory 606, where the memory 606 is configured to store data and a program of a related function, and the processor 601 is configured to read the data in the memory 606 and execute the program in the memory 606 to implement the related function. The memory 606 may also be referred to as a storage medium, a storage device, or the like. The memory 606 and the processor 601 may be integrated in one board. The terminal A may have a plurality of processors 601 and a plurality of memories 606.

In a second optional design, the communications apparatus includes a receiving unit, a sending unit, and a processing unit. A component that implements a receiving function in the transceiver component in the first optional design may be considered as the receiving unit, a component that implements a sending function in the transceiver component may be considered as the sending unit, and a processor is considered as the processing unit. The receiving unit may be usually referred to as a receiver, a receiver, or a receiver circuit. Correspondingly, the sending unit may be usually referred to as a transmitter, a transmitter, or a transmitter circuit.

Optionally, in this design, the communications apparatus includes a storage unit. The memory in the first optional design may be considered as the storage unit.

Method or algorithm steps described in combination with the content disclosed in the present invention may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A communications apparatus, comprising:
   a transceiver component; and
   at least one processor coupled with a non-transitory computer-readable storage medium storing programming instructions for execution by the at least one processor, wherein the programming instructions instruct the at least one processor to:
   receive, on a first downlink carrier using the transceiver component, a system message, wherein a frequency channel number of the first downlink carrier belongs to a first frequency band, wherein the first frequency band comprises the first downlink carrier and a first uplink carrier, wherein the system message comprises information indicating a frequency channel number of a second uplink carrier, wherein a frequency channel number of the second uplink carrier belongs to a second frequency band, wherein the second frequency band comprises a second downlink carrier and the second uplink carrier, and wherein the second frequency band is different from the first frequency band;
   initiate random access on the second uplink carrier using the transceiver component;
   receive, on the first downlink carrier using the transceiver component, information indicating a frequency channel number of the first uplink carrier, wherein the frequency channel number of the first uplink carrier belongs to the first frequency band;
   send, on the first uplink carrier using the transceiver component, a signal used to measure uplink quality of the first uplink carrier; and
   in response to determining that the uplink quality of the first uplink carrier exceeds a threshold, initiate a switch from the second uplink carrier to the first uplink carrier.

2. The communications apparatus according to claim 1, wherein the second frequency band that comprises the second uplink carrier and the second downlink carrier has lower frequencies than the first frequency band that comprises the first uplink carrier and the first downlink carrier.

3. The communications apparatus according to claim 1, wherein the programming instructions further instruct the at least one processor to initiate random access on the first uplink carrier using the transceiver component in response to the switch from the second uplink carrier to the first uplink carrier.

4. The communications apparatus according to claim 1, wherein the programming instructions instruct the at least one processor to send data via the second uplink carrier using the transceiver component after the random access on the second uplink carrier using the transceiver component.

5. The communications apparatus according to claim 1, wherein the programming instructions instruct the at least one processor to receive data via the first downlink carrier.

6. The communications apparatus according to claim 1, wherein the first frequency band and the second frequency band belong to different radio access technologies (rats).

7. The communications apparatus according to claim 6, wherein the first frequency band belongs to a Long Term Evolution (LTE) rat, and the second frequency band belongs to a new radio (NR) rat; or the first frequency band belongs to a new radio (NR) rat, and the second frequency band belongs to a Long Term Evolution (LTE) rat.

8. A communications apparatus, comprising:
a transceiver component; and
at least one processor coupled with a non-transitory computer-readable storage medium storing programming instructions for execution by the at least one processor, wherein the programming instructions instruct the at least one processor to:
send, via a first downlink carrier using the transceiver component, a system message, wherein a frequency channel number of the first downlink carrier belongs to a first frequency band, wherein the first frequency band comprises the first downlink carrier and a first uplink carrier, wherein the system message comprises information indicating a frequency channel number of a second uplink carrier, wherein a frequency channel number of the second uplink carrier belongs to a second frequency band, wherein the second frequency band comprises a second downlink carrier and the second uplink carrier, and wherein the second frequency band is different from the first frequency band;
receive a random access request on the second uplink carrier using the transceiver component;
send, via the first downlink carrier using the transceiver component, information indicating a frequency channel number of the first uplink carrier, wherein the frequency channel number of the first uplink carrier belongs to the first frequency band;
receive, via the first uplink carrier using the transceiver component, a signal used to measure uplink quality of the first uplink carrier; and
in response to determining that the uplink quality of the first uplink carrier exceeds a threshold, initiate a switch from the second uplink carrier to the first uplink carrier.

9. The communications apparatus according to claim 8, wherein the second frequency band that comprises the second uplink carrier and the second downlink carrier has lower frequencies than the first frequency band that comprises the first uplink carrier and the first downlink carrier.

10. The communications apparatus according to claim 8, wherein the programming instructions further instruct the at least one processor to initiate random access on the first uplink carrier using the transceiver component in response to the switch from the second uplink carrier to the first uplink carrier.

11. The communications apparatus according to claim 8, wherein the programming instructions further instruct the at least one processor to receive data via the second uplink carrier using the transceiver component after receiving the random access request on the second uplink carrier using the transceiver component.

12. The communications apparatus according to claim 8, wherein the programming instructions further instruct the at least one processor to send data via the first downlink carrier using the transceiver component.

13. The communications apparatus according to claim 8, wherein the first frequency band and the second frequency band belong to different communications standards.

14. The communications apparatus according to claim 13, wherein the first frequency band belongs to a Long Term Evolution (LTE) rat, and the second frequency band belongs to a new radio (NR) rat; or the first frequency band belongs to a new radio (NR) rat, and the second frequency band belongs to a Long Term Evolution (LTE) rat.

15. An access method, comprising:
receiving, by a terminal via a first downlink carrier, a system message, wherein a frequency channel number of the first downlink carrier belongs to a first frequency band, wherein the first frequency band comprises the first downlink carrier and a first uplink carrier, wherein the system message comprises information indicating a frequency channel number of a second uplink carrier, wherein a frequency channel number of the second uplink carrier belongs to a second frequency band, wherein the second frequency band comprises a second downlink carrier and the second uplink carrier, and wherein the second frequency band is different from the first frequency band;
initiating, by the terminal, random access via the second uplink carrier;
receiving, by the terminal via the first downlink carrier, information indicating a frequency channel number of the first uplink carrier, wherein the frequency channel number of the first uplink carrier belongs to the first frequency band;
sending, by the terminal via the first uplink carrier, a signal used to measure uplink quality of the first uplink carrier; and
in response to determining that the uplink quality of the first uplink carrier exceeds a threshold, initiating, by the terminal, a switch from the second uplink carrier to the first uplink carrier.

16. The method according to claim 15, wherein the second frequency band that comprises the second uplink carrier and the second downlink carrier has lower frequencies than the first frequency band that comprises the first uplink carrier and the first downlink carrier.

17. The method according to claim 15, further comprising:
initiating, by the terminal, random access on the first uplink carrier in response to the switch from the second uplink carrier to the first uplink carrier.

18. The method according to claim 15, further comprising:
sending, by the terminal, data via the second uplink carrier after the random access on the second uplink carrier.

19. The method according to claim 15, further comprising:
  receiving, by the terminal, data via the first downlink carrier.

20. The method according to claim 15, wherein the first frequency band and the second frequency band belong to different radio access technologies (rats).

* * * * *

UNITED STATES PATENT AND TRADEMARK OFFICE
CERTIFICATE OF CORRECTION

| | | |
|---|---|---|
| PATENT NO. | : 11,277,785 B2 | Page 1 of 1 |
| APPLICATION NO. | : 16/715734 | |
| DATED | : March 15, 2022 | |
| INVENTOR(S) | : Chaobin Yang et al. | |

It is certified that error appears in the above-identified patent and that said Letters Patent is hereby corrected as shown below:

On the Title Page

Column 2 (Abstract), Line 8, delete "carrier," and insert --carrier;--.

In the Specification

In Column 1, Line 8, delete "PCT/CN2018.091189," and insert --PCT/CN2018/091189,--.

Signed and Sealed this
Twenty-fourth Day of May, 2022

*Katherine Kelly Vidal*

Katherine Kelly Vidal
*Director of the United States Patent and Trademark Office*